Patented Dec. 13, 1932

1,891,181

UNITED STATES PATENT OFFICE

CHARLES T. RICHMAN, OF PHILADELPHIA, PENNSYLVANIA, ASSIGNOR, BY DIRECT AND MESNE ASSIGNMENTS, OF ONE-THIRD TO WILLIAM C. KUHN AND ONE-THIRD TO PETER J. SMITH, BOTH OF PHILADELPHIA, PENNSYLVANIA

MOTOR FUEL

No Drawing.   Application filed October 28, 1930.   Serial No. 491,821.

This invention relates to improvements in motor fuels.

The primary object of the present invention is to provide an improved motor fuel having alcohol as the basis thereof, and pyroligneous acid as an important ingredient which serves to reduce the specific gravity of the alcohol and makes it possible to use an alcohol of approximately 130 proof.

Another object of the invention is to provide a motor fuel which will be completely consumed, thereby eliminating carbon and carbon monoxide gas from the engine. With this fuel a development of from 15 to 50% more power is had than with gasoline or other fuel mixtures as a result of the high explosive and complete burning qualities of the fuel.

While any means may be employed for producing the alcohol used, it has been found that alcohol may be economically produced by starting fermentation in a suitable mash by adding alcohol thereto instead of allowing the alcohol to develop by the slow natural fermentation which would take place according to the usual method. By this process of using the alcohol as the fermentation starter the complete fermentation of the mash is accomplished in a relatively short period, or in approximately twenty-four hours, and the mash may be employed after removal of the alcohol therefrom for food purposes.

In preparing a gallon of the fuel according to the present invention approximately 2 ounces of the pyroligneous acid is added to 126 ounces of ethyl alcohol. Other formulas may be employed without reducing the efficiency of the fuel while at the same time rendering the alcohol unfit for drinking. For example, any one of the following six formulas may be employed in addition to the formula already given, which formula may be designated "Formula 1."

*Formula 2*

|  | Ounces |
|---|---|
| Alcohol | 124 |
| Pyroligneous acid | 1 |
| Camphor (spirits) | 2 |
| Maize oil | 1 |

*Formula 3*

|  | Ounces |
|---|---|
| Alcohol | 124 |
| Pyroligneous acid | 1 |
| Cotton seed oil | 1 |
| Camphor (spirits) | 2 |

*Formula 4*

|  | Ounces |
|---|---|
| Alcohol | 124 |
| Pyroligneous acid | 1 |
| Olive oil | 1 |
| Camphor (spirits) | 2 |

*Formula 5*

|  | Ounces |
|---|---|
| Alcohol | 124 |
| Pyroligneous acid | 1 |
| Fish oil | 1 |
| Camphor (spirits) | 1 |

*Formula 6*

|  | Ounces |
|---|---|
| Pyroligneous acid | 1 |
| Alcohol | 126 |
| Glycerin | 1 |
| Camphor (spirits) | 2 |

*Formula 7*

|  | Ounces |
|---|---|
| Pyroligneous acid | 1 |
| Alcohol | 126 |
| Castor oil | 1 |
| Camphor (spirits) | 2 |

In making up any one of the formulas 2 to 7 inclusive the ingredients are mixed by agitation and there is then drawn off from the liquid any oils which may have separated therefrom so that only a clear solution remains.

As previously stated, the pyroligneous acid with the alcohol gives a fuel superior to alcohol of high proof, making it possible to use an alcohol of approximately 130 proof. The other ingredients also add to the combustible qualities of the fuel and at the same time denaturize the alcohol.

While alcohol of 130 proof has been set forth in the specification as the strength employed, it is of course to be understood that this only represents the proof which has shown the best results thus far. Therefore, it is not to be understood that the invention is to be limited to the use of an alcohol of this proof. It is also to be understood that while a means has been described for producing alcohol from mash, any form of alcohol may be employed such as ethyl, methyl, butyl, etc. Also, gum camphor may be employed in place of the spirits called for in the formulas given.

Having thus described my invention, what I claim is:

1. An improved motor fuel consisting of alcohol of approximately 130 proof, pyroligneous acid, and camphor, the acid being employed in the proportion of approximately 2 ounces to 126 ounces of the alcohol.

2. An improved motor fuel consisting of alcohol, pyroligneous acid, and camphor.

3. An improved motor fuel consisting of alcohol, pyroligneous acid, camphor, and an oil.

4. An improved motor fuel consisting of alcohol, pyroligneous acid, camphor, and a vegetable oil.

5. An improved motor fuel consisting of alcohol, pyroligneous acid, glycerin, and camphor.

6. An improved motor fuel consisting of alcohol, pyroligneous acid, camphor, and fish oil.

In testimony whereof I hereunto affix my signature.

CHARLES T. RICHMAN.